(12) United States Patent
Rassi et al.

(10) Patent No.: US 9,527,341 B2
(45) Date of Patent: Dec. 27, 2016

(54) EXTRUDED BOARD WITH REALISTIC APPEARANCE

(71) Applicant: Poly-Wood, Inc., Syracuse, IN (US)

(72) Inventors: Douglas Rassi, Milford, IN (US); Jason Carrington, Goshen, IN (US); Kevin Nobes, Goshen, IN (US)

(73) Assignee: Poly-Wood, Inc., Syracuse, IN (US)

( * ) Notice: Subject to any disclaimer, the term of this patent is extended or adjusted under 35 U.S.C. 154(b) by 0 days.

(21) Appl. No.: 14/573,404

(22) Filed: Dec. 17, 2014

(65) Prior Publication Data

US 2016/0176230 A1 Jun. 23, 2016

(51) Int. Cl.

| | |
|---|---|
| *B44F 9/02* | (2006.01) |
| *B29C 47/00* | (2006.01) |
| *B28B 1/00* | (2006.01) |
| *B29C 47/04* | (2006.01) |
| *B29C 41/22* | (2006.01) |

(Continued)

(52) U.S. Cl.
CPC ............ *B44F 9/02* (2013.01); *B29C 47/0019* (2013.01); *B28B 1/005* (2013.01); *B29C 41/22* (2013.01); *B29C 43/30* (2013.01); *B29C 45/1634* (2013.01); *B29C 47/043* (2013.01); *B29C 47/046* (2013.01); *B29C 47/064* (2013.01); *B29K 2025/06* (2013.01); *B29K 2105/0032* (2013.01); *B29K 2995/002* (2013.01); *B29K 2995/0021* (2013.01); *B29L 2031/722* (2013.01); *B29L 2031/7222* (2013.01); *B44F 9/00* (2013.01); *B44F 9/04* (2013.01); *B44F 9/10* (2013.01); *C04B 2111/542* (2013.01); *C04B 2111/545* (2013.01);

(Continued)

(58) Field of Classification Search
None
See application file for complete search history.

(56) References Cited

U.S. PATENT DOCUMENTS

| | | | |
|---|---|---|---|
| 3,936,518 A | * | 2/1976 Soda | ........................ B29C 44/22 264/177.17 |
| 4,072,791 A | * | 2/1978 Randall | .................. B29C 47/046 264/173.18 |

(Continued)

OTHER PUBLICATIONS

International Search Report corresponding to international application No. PCT/US2015/62981, mailed Mar. 28, 2016 (5 pages).

*Primary Examiner* — Jeffrey Wollschlager
(74) *Attorney, Agent, or Firm* — Maginot, Moore & Beck, LLP

(57) ABSTRACT

In one embodiment, an extruded board includes at least one streak portion including a first colored portion at an outer surface of a core portion of the board, a second colored portion extending into the core from the first colored portion, and a third colored portion extending further into the core from the second colored portion, and at least one resin portion including a first base portion located directly between the second colored portion and the outer surface, and a second base portion located directly between the third colored portion and the outer surface, the resin portion having an opacity which allows the second colored portion to be viewed from the outer surface through the first base portion under natural light, and which does not allow the third colored portion to the viewed from the outer surface through the second base portion under natural light.

10 Claims, 7 Drawing Sheets
(2 of 7 Drawing Sheet(s) Filed in Color)

(51) Int. Cl.
*B29C 45/16* (2006.01)
*B29C 43/30* (2006.01)
*B29L 31/00* (2006.01)
*B29K 105/00* (2006.01)
*B44F 9/04* (2006.01)
*B44F 9/00* (2006.01)
*C04B 111/54* (2006.01)
*B44F 9/10* (2006.01)
*D06N 7/00* (2006.01)
*B29C 47/06* (2006.01)
*B29K 25/00* (2006.01)

(52) U.S. Cl.
CPC ..... *D06N 7/0028* (2013.01); *Y10T 428/24438* (2015.01); *Y10T 428/24901* (2015.01)

(56) References Cited

U.S. PATENT DOCUMENTS

| | | | | |
|---|---|---|---|---|
| 4,185,951 A * | 1/1980 | Webermeier | ......... | B29C 47/046 425/133.5 |
| 4,610,900 A * | 9/1986 | Nishibori | ......... | B44C 3/04 156/209 |
| 4,921,414 A * | 5/1990 | Schliehe | ......... | B29C 47/046 264/75 |
| 5,516,472 A | 5/1996 | Laver | | |
| 5,700,555 A * | 12/1997 | Grill | ......... | B27N 3/28 422/286 |
| 5,869,138 A * | 2/1999 | Nishibori | ......... | B27N 3/007 264/148 |
| 5,998,006 A * | 12/1999 | Bambara | ......... | B29C 47/046 264/171.1 |
| 6,046,265 A * | 4/2000 | Clark | ......... | C08J 3/226 524/423 |
| 6,153,293 A | 11/2000 | Dahl et al. | | |
| 6,692,815 B2 | 2/2004 | Edgman | | |
| 6,726,464 B1 * | 4/2004 | Kato | ......... | B29B 7/421 366/75 |
| 7,507,464 B2 | 3/2009 | Walrath | | |
| 7,763,345 B2 | 7/2010 | Chen et al. | | |
| 8,210,616 B2 | 7/2012 | Schwartz | | |
| 2002/0107326 A1* | 8/2002 | Hendess | ......... | B29C 47/686 525/199 |
| 2002/0125594 A1* | 9/2002 | Sung | ......... | B27N 3/28 264/40.1 |
| 2004/0038002 A1* | 2/2004 | Franco | ......... | B29C 47/90 428/151 |
| 2005/0003221 A1 | 1/2005 | Walrath | | |
| 2005/0053767 A1 | 3/2005 | Franco et al. | | |
| 2006/0061004 A1* | 3/2006 | Bufton | ......... | B29C 47/0038 264/75 |
| 2006/0205846 A1* | 9/2006 | Spitz | ......... | C08J 3/201 524/9 |
| 2007/0091614 A1 | 4/2007 | Kaisser et al. | | |
| 2010/0107530 A1 | 5/2010 | Pietruczynik et al. | | |
| 2012/0210663 A1 | 8/2012 | May | | |
| 2013/0224437 A1 | 8/2013 | Park et al. | | |
| 2014/0069580 A1* | 3/2014 | Bogan | ......... | B63H 1/36 156/265 |

\* cited by examiner

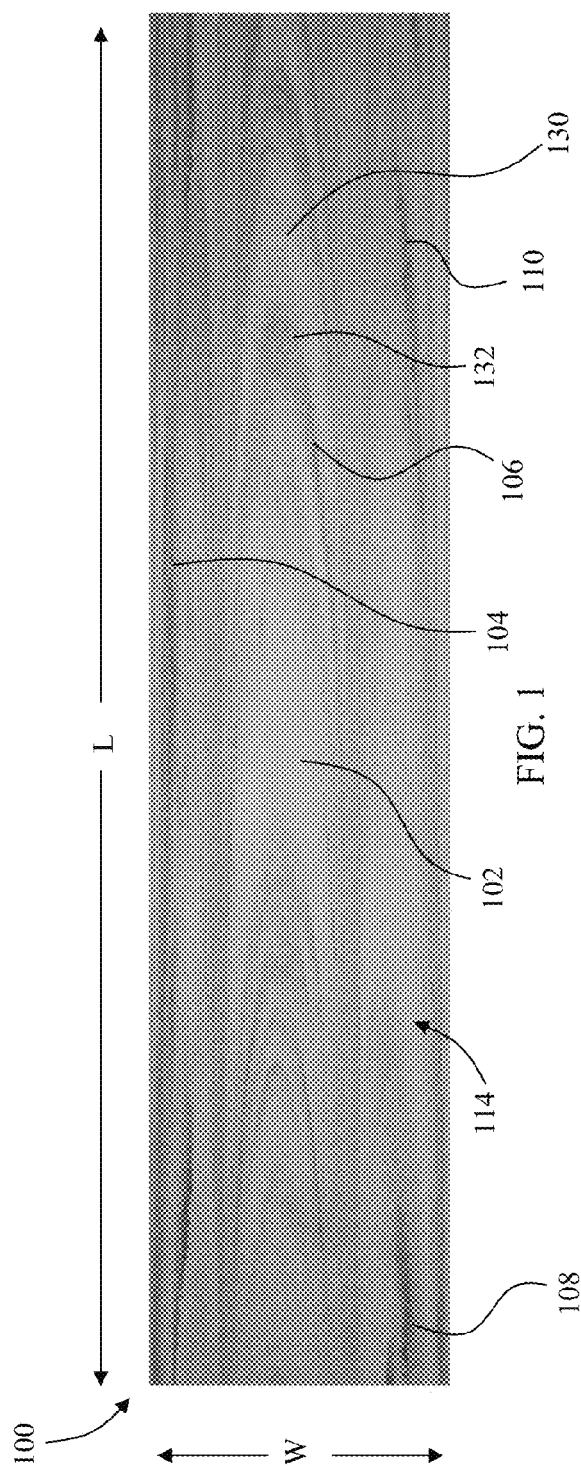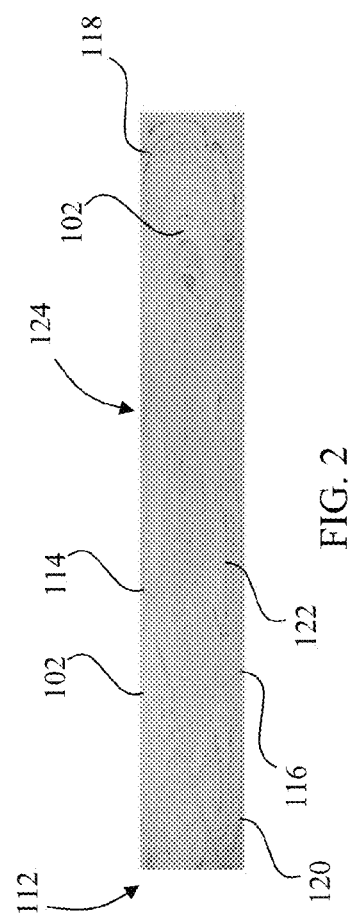

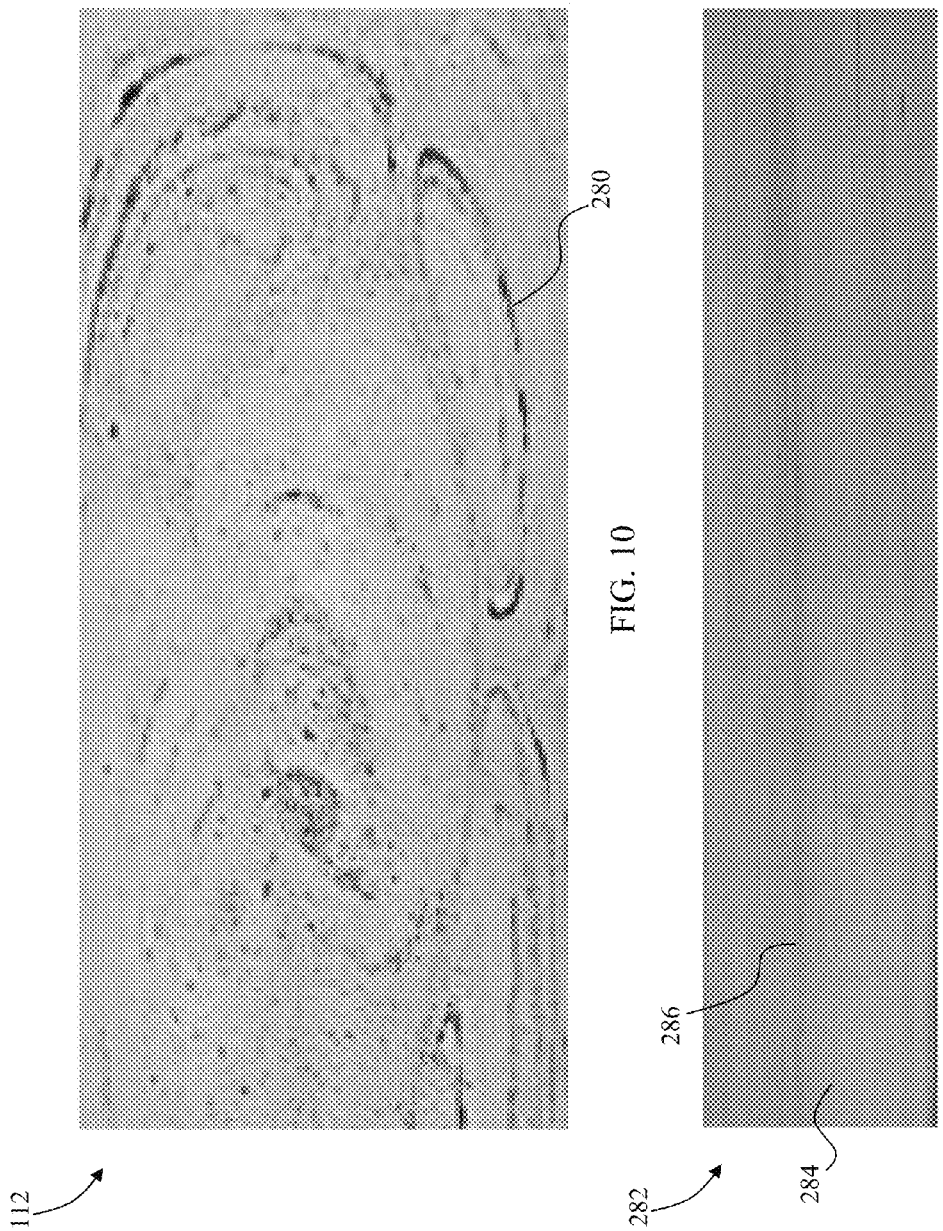

EXTRUDED BOARD WITH REALISTIC APPEARANCE

FIELD

This disclosure relates to extruded plastic articles.

BACKGROUND

Wood is a common and highly valued resource in the manufacture of items including outdoor furniture. Wood is a natural material which is strong and typically quite durable. Nonetheless, wood is a natural product which is susceptible to various pests and decay. Accordingly, wood can deteriorate over time.

A historical benefit of wood is that wood is a renewable resource. As the demand for wood has increased, however, the sourcing of wood has become problematic. Wood boards which are used in the manufacture of items also have a variety of grain patterns which add tremendously to the beauty of the finished products. Different varieties of wood, however, produce different grain patterns, with some of the more desirable grain patterns being found in wood types which are not as readily renewable as other types of wood.

In response to the difficulty in overcoming some of the above described problems, various attempts have been made to replicate the look of wood in non-wood products. In some of these approaches, wood is mixed with a resin in order to extrude an artificial board. A major shortcoming of these approaches is that the resulting product looks more like a plastic board than a wood board.

Other approaches to mimicking the look of real wood is the embossing of boards with a grain-like pattern. While this approach provides, at least to some extent, a grain-like feel to the boards and a superficial three dimensional look to the grain, simply embossing a board fails to achieve a true three dimensional look of wood grain which provides the basic beauty of wood boards.

Some processes have been developed in an attempt to more closely mimic the three dimensional look of wood grain. For example, U.S. Patent Application Publication No. 2010/0107530, published on May 6, 2010, describes a process wherein colored streakers are introduced into a transparent or translucent matrix. The streakers are selected to melt during processing of the extrudate such that they are not mixed with the rest of the extrudate. The result is a "streak" within the transparent or translucent material which provides a depth to the product. Additional "wood-like" characteristics are provided by embossing a grain-like texture into the transparent or translucent. The streaks in these products help provide a three dimensional look of wood grain when viewed from afar. Of course, graining of natural wood is not simply the result of streaks of color in a transparent or translucent matrix. Moreover, the streaking of the '530 publication is located in a layer formed over the core material, adding complexity to manufacturing.

What is needed therefore is a board which presents a realistic look similar to the look of natural wood. A further need exists for realistic board which can be manufactured without excessive modification of known devices. A realistic board which can be stained using commercially available stains would also be beneficial.

SUMMARY

In one embodiment, an extruded board includes a core having a first outer surface and a second outer surface opposite to the first outer surface, at least one streak portion, each of the at least one streak portions including a first colored portion at the first outer surface, a second colored portion extending into the core from the first colored portion, and a third colored portion extending further into the core from the second colored portion, and at least one resin portion, each of the at least one resin portions associated with a respective one of the at least one streak portions and including a first base portion located directly between the second colored portion of the respective at least one streak portion and the first outer surface, and a second base portion located directly between the third colored portion of the respective at least one streak portion and the first outer surface, each of the at least one resin portions having an opacity which allows the respective second colored portion to be viewed from the first outer surface through the first base portion under natural light, and which does not allow the respective third colored portion to the viewed from the first outer surface through the second base portion under natural light.

In one or more embodiments, the second colored portion is visible from the first outer surface through the second base portion at a depth of about 0.02 inches beneath the first outer surface under natural light.

In one or more embodiments the first outer surface is an exposed outer surface of the core.

In one or more embodiments, the at least one first resin portion includes a plurality of first resin portions extending into the core from the outer surface, each of the plurality of first resin portions non-determinatively distributed within the extruded board.

In one or more embodiments, each of the plurality of first resin portions exhibit uneven thickness, uneven width, or uneven length.

In one or more embodiments, each of the plurality of first resin portions exhibit uneven thickness, uneven width, and uneven length.

In one or more embodiments, the at least one first resin portion has a first opacity, the at least one second resin portion has a second opacity, and the first opacity is less than the second opacity.

In one or more embodiments, an extruded board includes a plurality of voids distributed within the at least one first resin portion and the at least one second resin portion, a portion of the plurality of voids opening to the first outer surface of the extruded board.

In one or more embodiments, the at least one first resin portion and the at least one second resin portion are formed from a base resin, the base resin including general purpose polystyrene, high impact polystyrene, and chemical foaming agents.

In one or more embodiments, the at least one first resin portion includes a first resin portion having a first color additive, a second resin portion having a second color additive, and a third resin portion having a third color additive, wherein each of the first color additive, the second color additive, and the third color additive is a color additive different from the other of the first color additive, the second color additive, and the third color additive.

In one embodiment, a method of forming an extruded board includes melting a base resin, coloring the melted base resin with a color additive, transporting the melted colored base resin and a plurality of at least partially un-melted streaker pellets to a breaker plate with an extruder, melting the at least partially un-melted streaker pellets by forcing the transported melted colored base resin and plurality of at least partially un-melted streaker pellets through the breaker plate, streaking the melted streaker pellets within the transported melted colored base resin, and shaping the streaked transported melted colored base resin into a core having a pair of opposing outer surfaces.

In one or more embodiments, a method of forming an extruded board includes transporting a chemical foaming agent to the breaker plate with the melted colored base resin and the plurality of at least partially un-melted streaker pellets with the extruder, and forming a plurality of voids within the streaked transported melted colored base resin with the chemical foaming agent, at least a portion of the plurality of voids opening to an outer surface of the board.

In one or more embodiments, a method of forming an extruded board includes removing an outer surface layer of the board thereby exposing streak portions within an outer portion of the board.

In one or more embodiments, removing the outer surface layer of the board includes removing an outer surface layer of between about 0.20 inches and 0.060 inches of the board.

In one or more embodiments, a method of forming an extruded board includes embossing the outer exposed portion of the board.

In one or more embodiments, a method of forming an extruded board includes forming a clear sealer layer on the embossed outer exposed portion of the board.

In one or more embodiments melting the at least partially un-melted streaker pellets comprises forcing the at least partially un-melted streaker pellets toward a breaker plate located adjacent an end portion of an extruder, and streaking the melted streaker pellets within the transported melted colored base resin comprises slowing movement of the melted streaker pellets with respect to a bulk flow using a breaker plate having a plurality of openings therethrough and located adjacent an end portion of an extruder screw.

In one or more embodiments streaking the melted streaker pellets further includes forcing the melted streaker pellets through a plurality of concentrically formed orifices.

In one or more embodiments, streaking the melted streaker pellets further includes forcing the melted streaker pellets through a plurality of concentrically formed circular orifices.

In one or more embodiments, a method of forming an extruded board uses a breaker plate wherein all of the orifices are located peripherally about the breaker plate, and the method further includes rolling the melted colored base resin and the streaked melted streaker pellets with a cone shaped portion of the breaker plate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 depicts color photograph of a top plan view of a portion of an exposed outer surface of an extruded board in accordance with the disclosure;

FIG. 2 depicts a color photograph of a cross-section of the extruded board of FIG. 1;

FIG. 10 depicts a color photograph of a portion of the cross-section of FIG. 2 with adjusted contrast to show generally oval patterns formed by streaker pellets within the base resin;

FIG. 11 depicts color photograph of an extruded outer surface of an extruded board;

DESCRIPTION

Figure 3:
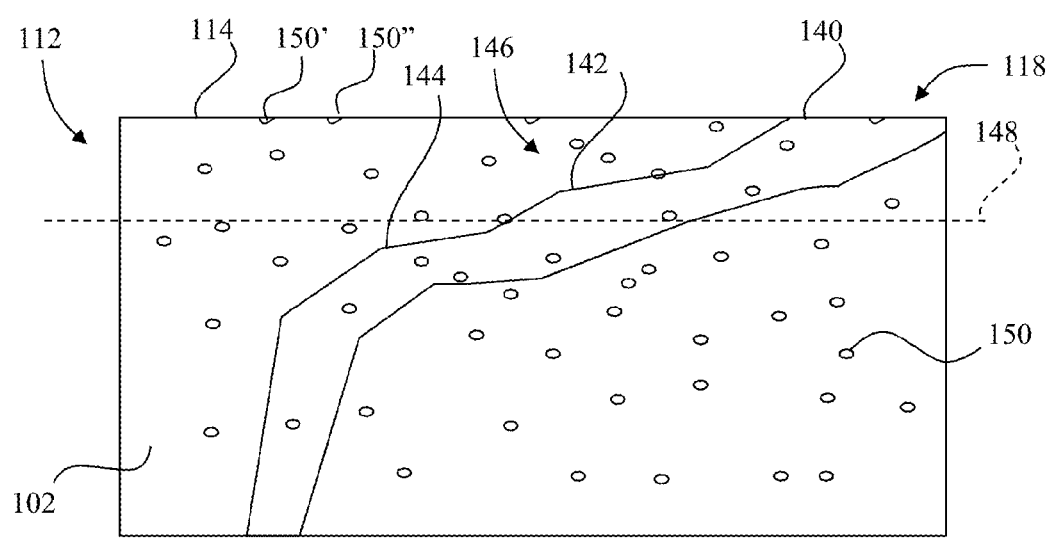
FIG. 3 depicts a schematic diagram of a portion of the cross-section of FIG. 2 including a representation of a depth of view.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Referring now to FIG. 1, there is shown a portion of an extruded board 100. The board 100 includes a colored base resin 102 and a number of streaks including streaks 104, 106, 108, and 110. The colored base resin 102 and the streaks 104, 106, 108, and 110 are formed within the core of the board 100.

By way of explanation, FIG. 2 is an end view of the board 100 showing the core 112. In FIG. 2, portions of the colored base resin 102 are located at the exposed outer surface 114, the exposed outer surface 116, and at locations between the opposite exposed outer surfaces 114/116. Likewise, streaks such as the streak 118 extend from the exposed outer surface 114 to an inner portion of the core while a streak 120 extends from the exposed outer surface 116 to an inner portion of the core. Other streaks, such as the streak 122, are located completely within the inner portion of the core. Accordingly, while the view of FIG. 2 is an end view, a similar pattern of colored base resin 102 and streaks are exhibited at any given cross-section through the board 100.

Returning to FIG. 1, each of the streaks 104, 106, 108, and 110 is shaped differently from each of the other streaks 104, 106, 108, and 110. Thus, while the streak 108 is somewhat linear, the streak 106 is more of a chevron shape. The streaks in the board 100, including the streaks 104, 106, 108, and 110, thus present as linear streaks, cathedrals, arches, chevrons, and other shapes.

Streaks of different types have an overall width across the width "W" of the board 102 which are different from the overall width of the other streaks. For example, the streak 108 is relatively narrow and has a slight lateral drift resulting in a small overall width while the streak 106 has larger overall width. Likewise, the axial coverage of the streaks 104, 106, 108, and 110 vary along the length "L" of the board 100. For example, the terminus of the streak 106 is farther to the left than the terminus of the streak 110.

Even streaks which are somewhat similar are typically different from each other. For example, streaks 104 and 108 are both generally linear. The streak 104, however, is much narrower and longer than the streak 106. Additionally, each of the streaks 104, 106, 108, and 110 is non-uniform.

The board 100 also has a colored base resin portion 130, and a feathered portion 132. The colored base resin 130 is similar to the colored base resin 102, but is a slightly darker hue. The feathered portion 132 is a portion of a streak that blends into the colored base resin 130. Other types of patterns can also be realized, including areas having a burled appearance.

Some of the appearance of the board 100 as depicted in FIG. 1 is provided by exposed surface features of the board 100 while other features are provided by the opacity of the colored base resin 102. This is explained with reference to FIG. 3 which schematically depicts a portion of the core 112 of FIG. 2. Within the core 112, a portion of the streak 118 is depicted. The streak 118 includes an exposed surface portion 140, a first buried portion 142, and a second buried portion 144. The exposed surface portion 140 forms a portion of the exposed outer surface 114 of the board and is visible to an observer under natural light.

The buried portion 142 is spaced apart from the exposed outer surface 114 by a portion 146 of the colored base resin 102. The colored base resin 102 has an opacity which allows for the buried portion 142 to be visible to an observer under natural light. "Natural light" as that term is used herein is illumination of about 10,000 lux which is about the outdoor light level on a clear day. Beyond a certain depth, however, the opacity of the colored base resin 102 will not allow the streak 118 to be visible to an observer under natural light. Thus, the buried portion 144 is not visible to an observer under natural light.

The colored base resin 102 in one embodiment is formulated to allow the streak 118 to be visible through the colored base resin 102 at a greater depth than previously known formulations without resorting to a substantially transparent formula. By way of example, previously known blends have used a formula resulting in an opacity of about 4.67 measured on a scale of 0-5 with "0" being transparent and "5" being opaque. By modifying the formula to achieve an opacity of the colored base resin of about 2.91, visibility to a depth of about 0.02 inches under natural light is achieved. This amount of opacity provides a more realistic look.

The resulting opacity under natural light is indicated in FIG. 3 by a nominal depth of view line 148. Under various circumstances, however, the actual depth of view will vary from the nominal depth of view line 148. For example, a very thin layer of the streak 118 may not be visible even though the thin layer is above the nominal depth of view line 148. This provides some of the feathering effect depicted by the feathered portion 132 in FIG. 1.

Moreover, as noted above with respect to FIG. 1, the colored base resin 130 is darker than the colored base resin 102. The darker hue results in a greater opacity. Thus, areas with darker colored base resin have an actual depth of view that is less than the nominal depth of view line 148.

The end result is that the board 100 exhibits a three dimensional character which is constantly shifting over the length and width of the board. The board 100 is thus aesthetically pleasing, exhibiting a "natural" look like the look of grains in wood boards.

Returning to FIG. 3, the board 100 further includes a number of void spaces 150. The void spaces 150 are formed using a foaming agent as is generally known in the art. The void spaces 150, however, are not limited to the inner portion of the core 112 as is generally practiced. Rather, the void spaces 150 are spread throughout the core. Some of the void spaces 150, such as void spaces 150' and 150", actually open to the outer surface 114. These voids provide texture to the outer surface 114, which in some cases is augmented by embossed grain-like patterns, which is closer to the feel of real wood than the feel provided by previously known extruded boards. Moreover, the "pores" formed by the void spaces which open to the outer surface 114 permit the board 100 to retain stains.

Figure 4:
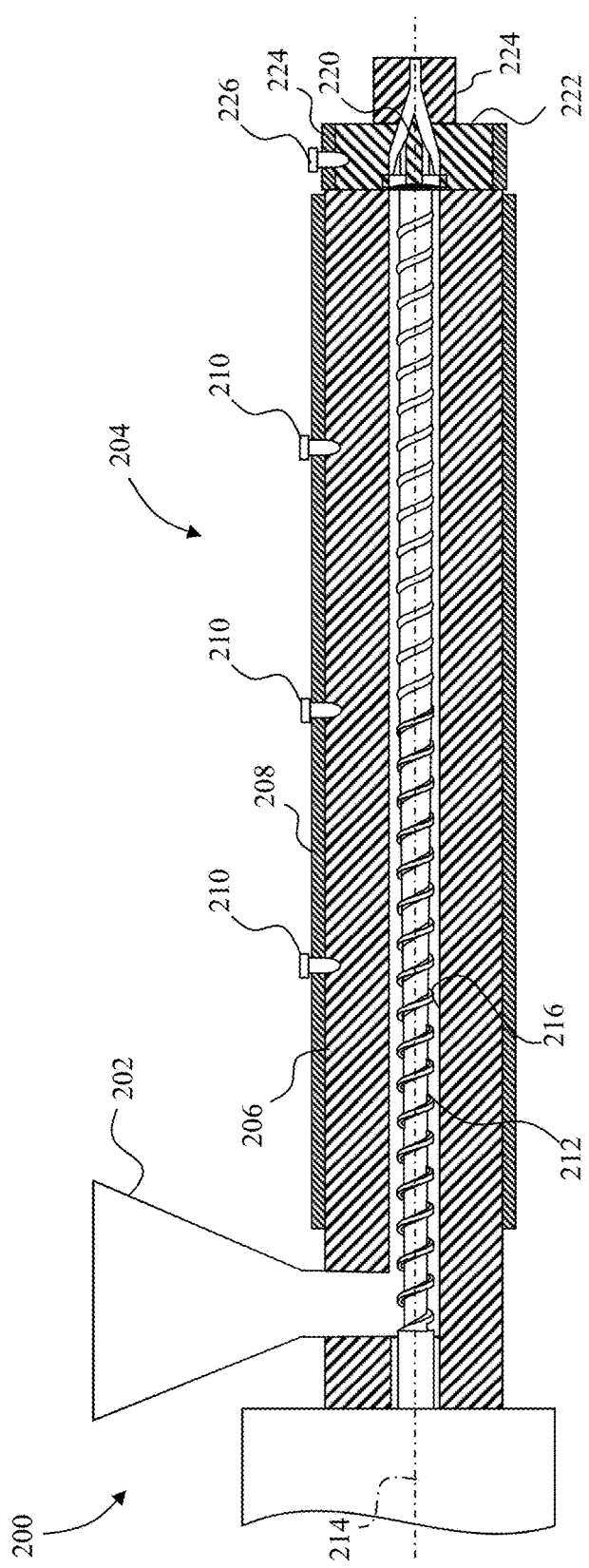
FIG. 4 depicts a simplified cross-sectional view of an extruder including a modified screw and breaker plate which can be used to extrude the extruded board of FIG. 1.

The board 100 is formed using an extrusion system 200 partially depicted in FIG. 4. The extrusion system 200 includes a hopper assembly 202 and an extruder 204. The hopper assembly 202 in one embodiment is a Maguire 220 gravimetric blender, with three additive feeders, commercially available from Maguire Products, Inc. of Aston Pa., U.S., while the extruder is a Polytruder 32:1 4.5" diameter single stage extruder with a 150 HP DC motor commercially available from Polytruder Extruder Corp. of Brampton, Ontario, Canada.

The extruder 204 includes a barrel 206. The barrel 206 is enclosed by a heater 208. A number of thermocouples 210 extend through the heater 208 into the barrel 206. The heater 208 is an electric heater with forced air (fan) cooling on 6 zones. A screw 212 extends along an extrusion axis 214 within a chamber 216 in the barrel 206. In some embodiments, a hardened liner (not shown) is provided at the outer wall of the chamber 216.

A breaker plate 220 is positioned at the distal end portion of the extruder 204 by an adapter 222. A heater 224 is located about the adapter 222 and a thermocouple 226 extends through the heater 224 into the adapter 222. A die 224 is positioned at the outlet of the adapter 222.

In operation, a blend of raw materials is provided to the extruder 204 through the hopper assembly 202. The blend includes a base resin which includes general purpose polystyrene (GPPS) virgin and recycled, and high impact polystyrene (HIPS). Additional materials include chemical foaming agents (CFA's), color concentrates (base color and "streakers") and UV stabilizers. These materials are blended to achieve a bulk density range of 0.500-0.775 SG when in lumber form. Density is varied to achieve a desired mechanical performance (i.e.: flexural strength, screw retention, brittleness etc.).

The HIPS formulation was developed with products commercially available from Total Petrochemicals & Refining USA, Inc. of Houston, Tex., U.S. The HIPS includes 85% by weight 585 PSC (polystyrene crystal) and 15% by weight 825E PSI (impact polystyrene). This formula was developed to meet performance expectation and allow for the PSC to be displaced by readily available recycle products that are available on the open market. Performance expectations include sufficient transparency to allow some depth of visibility into the material as discussed below.

The base color is selected for a desired background color of the board. In one embodiment, color concentrate is obtained from Technical Polymer Representative Inc. of Amherst Ohio, U.S. The color is selected to provide the desired opacity when mixed with the base resin to provide the colored base resin 102. Less transparent color concentrates will obscure and hide the graining effect discussed below. More transparent materials will present the graining pattern in a more 3D appearance with lighter and darker shades at different depths in the base material. A good three dimensional effect can be realized by using a base color which results in a depth of view of about 0.02 inches. The base color additive typically includes UV stabilizers, and accounts for about 3% by weight of the blend of raw materials.

The CFA is about 1.05% by weight of the blend of raw materials. The CFA is produced by Bergen International, LLC of Hasbrouck Heights, N.J., U.S. The CFA is an endothermic/exothermic blend of chemicals designed to produce maximum cell structure thru the production of gas spheres while minimizing the size of the spheres themselves. The blend for a desired application is a design choice.

The streakers are provided at about 0.04% by weight of the blend of raw materials. For applications wherein a "tighter" grain pattern is desired, a slightly larger amount of streakers may be provided. Conversely, a "looser" grain pattern can use a lesser amount. Additional variation in the grain pattern is achieved by modifications to the size and shape of the streaker pellets.

The streakers in one embodiment are obtained from Americhem of Cuyahoga Falls, Ohio, U.S. while in another embodiment they are obtained from Mosaic Color & Additives, LLC of Greenville, S.C., U.S. The particular streakers used in a given application are largely a design choice. Nonetheless, several principles are typically followed. For example, in order for the process described in further detail below to produce "grain" patterns, the streakers are selected to include a material which melts at a temperature and pressure different from the materials selected for the base resin and base color. Typically, the bulk material of the streaker bead or pellet will have a higher melting point. In some embodiments, only the outer shell of the pellet has a higher melting point.

Another consideration for the streaker material is the opacity of the streaker material. Generally the streakers will exhibit a higher opacity than the base color concentrate. Additionally, while in some embodiments a streaker of a single color is used, in other embodiments two or more streaker colors are used. Even when a single streaker color is used, the resulting grain pattern will typically exhibit multiple colors because of the interaction of the streakers with the base color and the resin as discussed in more detail below.

As the blended raw materials are fed into the chamber 216, the base resin is melted. To this end, the first zone of the barrel 206 is heated to about 305° F., which is above the melting temperature of the base resin which melts, at the pressure in the chamber, at about 298-308° F. The base color additive also melts at this temperature and pressure. The screw within the first zone is configured to provide a thorough mixing of the melted extrudate. The screw must be configured, however, such that an exorbitant amount of streaker pellets is not melted within the first zone of the barrel 206.

Figure 5:
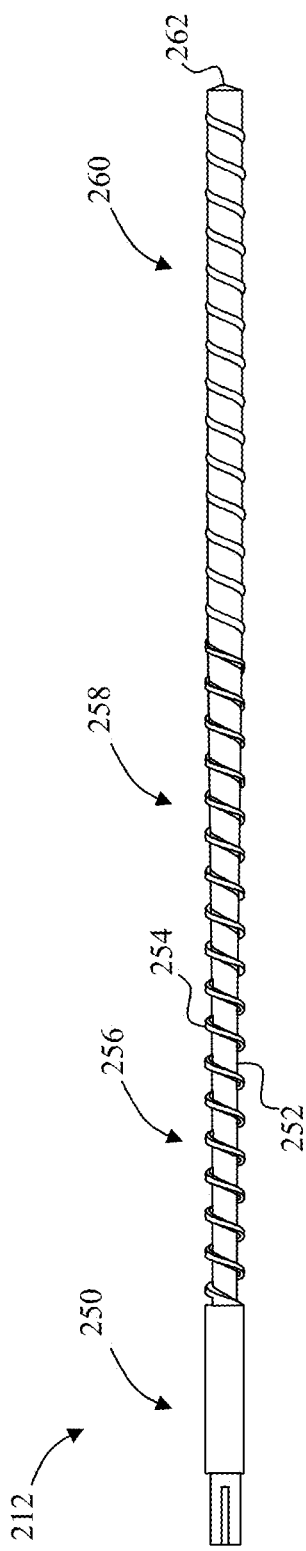
FIG. 5 depicts a side plan view of the screw in the extruder of FIG. 4.
Figure 6:
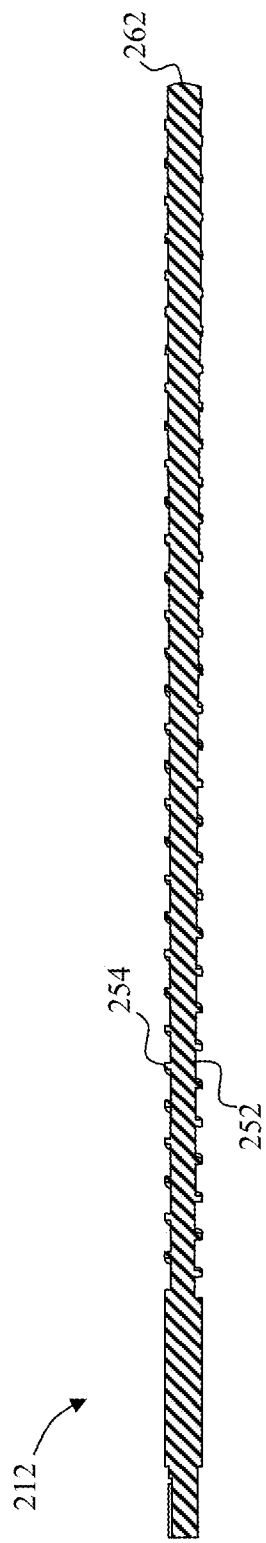
FIG. 6 depicts a cross-sectional view of the screw in the extruder of FIG. 4.

One configuration of a screw which prevents exorbitant melting of the streaker pellets is shown in FIGS. 5 and 6. The screw 212 includes a power coupling portion 250 and a shaft 252. A single thread 254 extends helically about the shaft 252 from a feed section 256, through a tapered section 258, to a distal portion 260 which terminates at a conical tip portion 262. The helical thread 254 has a width of 0.63 inches and a uniform outer diameter of about 4.485 inches. The thread 254 has a 5 degree pitch and is configured such that opposing surfaces of the thread are about 4.49 inches apart along the shaft 252.

The diameter of the shaft 252, however, varies. Within the feed section 254, which is about 38 inches long, the shaft has a diameter of about 3 inches resulting in a thread height of about 0.74 inches. Within the distal portion 260, which is about 64.63 inches long, the shaft 252 has a constant diameter of 4.0 inches resulting in a thread height of about 0.24 inches. The tapered portion 258 of the shaft tapers between the smaller diameter at the feed section 256 and the larger diameter of the distal section 260.

The relatively high thread height within the feed section 256 provides thorough mixing of the melted base resin and base color additive. As noted above, however, the streakers are selected so that they do not melt given the nominal temperature and pressure established in the first zone of the chamber 216. Nonetheless, high shear forces at the outer edges of the thread 254 are caused by the relatively high thread height within the feed section 256, resulting in some of the streaker pellets melting. The melted streakers are therefore mixed by the screw into the colored base resin, creating the deeper hues of the base resin such as the colored base resin 130 of FIG. 1. As discussed above, this will reduce the depth of view, but the reduction will be gradual due to the mixing of the streaker into the colored base resin 130. This adds to the complexity of the board without unduly increasing the opacity of the colored base resin 130.

As the extrudate approaches the transition from the feed section 256 to the tapered section 258, the extrudate is substantially completely mixed. Therefore, there is no need for the thread height of the feed section 256 to be extended into the tapered section. Moreover, in order to force the extrudate through the distal portion of the extruder 204, increased pressure is needed. Both of these goals are realized by the increasing diameter of the shaft 252 within the tapered section. Advantageously, the reduced thread height results in reduced shear forces. Accordingly, the potential for addition melting of streaker pellets is substantially reduced, even as the pressure is increased. This also allows for increased temperatures within the tapered section. Accordingly, the temperature in one embodiment is increased using a zone heating scheme with six zones from 305 degrees F. in the feed section to about 320 degrees in portions of the tapered and distal portions 258 and 260.

Figure 7:
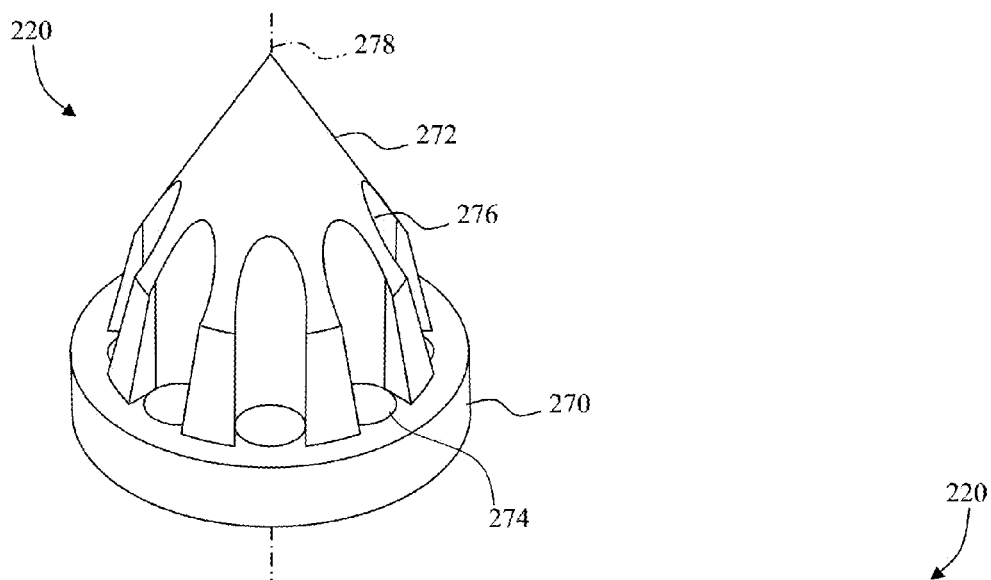
FIG. 7 depicts a perspective view of the breaker plate of FIG. 4.
Figure 8:
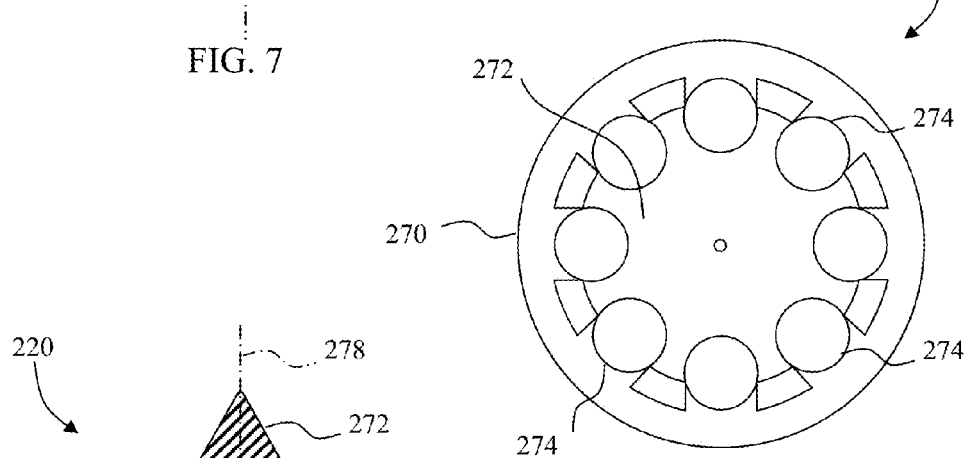
FIG. 8 depicts a back plan view of the breaker plate of FIG. 4.
Figure 9:
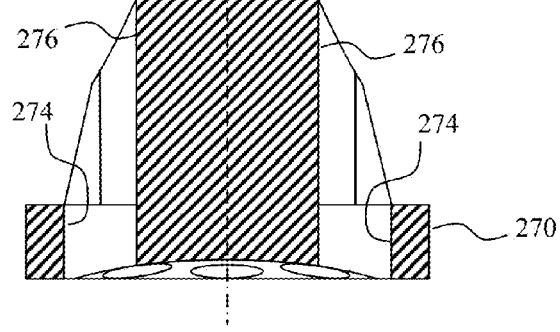
FIG. 9 depicts a cross-sectional view of the breaker plate of FIG. 4.

As the screw 212 forces the extrudate through the distal portion 260, the temperature of the extrudate is nominally maintained at about 305-315 degrees F. This is just below the melting point of the streaker pellets at the pressure within the distal portion 260. The screw 212 then forces the extrudate through the breaker plate 220, resulting in the melting of the streaker pellets as further explained with reference to FIGS. 7-9 which show additional detail of the breaker plate 220.

The breaker plate 220 includes a base portion 270, a generally conical central core portion 272, and a plurality of openings 274. Each of a plurality of grooves 276 is associated with a respective one of the openings 274, and extends from the associated opening 274 within the central core portion 272 along a longitudinal axis 278 of the breaker plate 220. A hollow 280 is defined by the base portion 270. The hollow 280 is configured to be positioned about 1 inch away from the conical tip portion 262 of the screw 212 (see FIGS. 4 and 5) such that the longitudinal axis 278 is aligned with the extrusion axis 214.

In this embodiment, the openings 274 are one inch diameter circular openings and the center of each of the circles is located 1.75 inches away from the longitudinal axis 276 of the breaker plate 220. As the extrudate is forced through the openings 274, the increased pressure and shear forces melt the remaining streaker pellets. The molten particles, however, are not mixed into the bulk of the extrudate. Rather, as the extrudate is forced off of the screw 212, the extrudate is twisting. The breaker plate 220 forces the material into a linear flow and provides steel surfaces that the molten streaker pellets touch and stick to. The flow of the extrudate thus stretches the streaker pellets predominantly axially along the extrusion axis 214 as the bulk portion of the extrudate travels across the streaker pellets which are stuck to the breaker plate causing discoloration of the base resin in a linear wood grain pattern. Some radial movement is also possible as the breaker plate linearizes the twisting bulk flow.

As the extrudate continues along the grooves 276 and the central core 272, the extrudate in the center of the flow is slowed, resulting in a rolling of the streaked extrudate. The rolling forces portions of the streaked extrudate toward the outer surface of the bulk extrudate. The net effect of the movement of the extrudate, including the molten streaker pellets, through the breaker plate is the formation of a plurality of generally ovoid shapes such as the ovoid shape 280 of FIG. 10. FIG. 10 is a portion of the core 112 of FIG. 2. Thus, the material depicted in FIG. 10 has undergone additional process steps after passage through the breaker plate 220. Nonetheless, at least a similar patterning is believed to be present in the extrudate as it exits the breaker plate 220.

After leaving the breaker plate 220, the extrudate is passed through an extrusion die which shapes the extrudate. In one embodiment, the extrusion die is a traditional "dog bone" in shape and smaller than the finished part.

The shaped extrudate is then passed to a calibrator and thereafter cut to length. The calibrator is submerged in a vacuum bulkhead of the calibration tank, and acts as a form to which the extrudate expands as the gas pressure created by the CFA's normalizes after exiting the die. The calibrator is predrilled with small vacuum holes and the bulkhead is kept under negative pressure to assist the gas in forcing the extrudate to the inside of the form and to keep the extrudate from distorting as the extrudate cools. The entire calibrator can be submerged/spray cooled or cooled by closed loop cooling channels built into the tool. Additional racks in the following tanks hold plates with the profile shape machined thru them. The plates help to hold the shape of the part as it is further cooled. Both the calibrator and the plates are sized with the understanding that the part shrinks during cooling.

After cooling, the extruded boards exhibit a graining pattern similar to the board 282 depicted in FIG. 11. Like the board 100, the extruded outer surface 284 of the board 282 includes streaks 286 which are visible down to a depth of about 0.02 inches below the extruded outer surface 284 (see, e.g., FIG. 3). While exhibiting many of the same characteristics of the extruded board 100, the streaks 286 visible at and through the extruded outer surface 284 are more predominantly linear. This is a very pleasing look, and in some embodiments the extruded outer surface 284 is the outer surface of the finally formed board.

If a more complex pattern is desired, however, an outer layer of the extruded board can be removed. Because of the manner in which the extrudate flows, and the manner in which the streaker pellets are spread in the extrudate, a more complex pattern is developed beneath the outer surface than at the outer surface of the "as extruded" board. The amount of material removed from the extruded is accounted for in establishing the "as extruded" size of the board. While any removal of material will modify the pattern, by planing or sanding about 0.020 to 0.060 inches off of the extruded board, an exposed outer surface is revealed such as the exposed outer surface 114 of FIG. 1.

As used herein, the phrase "exposed outer surface" means an outer surface of an extruded board which is exposed by removing a portion of the extruded outer surface of the board. An "extruded outer surface" is the outer surface of the resin portion of an extruded board. In both instances, as discussed below, a layer of transparent material may be formed on the exposed outer surface or extruded outer surface. Such added layers are not "exposed outer surfaces" or "extruded outer surfaces" as those terms are used herein.

Once the desired graining has been obtained, either by extrusion alone or by further removing one or more layers of material from the extruded board, additional processing of the board may be undertaken. In some embodiments, silicone wheels are heated and pressed into the surface of the profile to remove sheen, die lines and imperfections. The resulting surface texture presents as a dry matte finish. In some embodiments, the board travels through a heat tunnel which re-plasticizes the extruded outer surface or the exposed outer surface. Engraved wheels with a wood grain texture are pressed into the plasticized surface and transfer the texture into the extruded part.

Once the desired surface characteristics are effected, the board can be stained. In some embodiments, in either an unstained or stained condition, a clear sealer is applied to the extruded boards to seal them from staining and dirt and to add an additional layer of UV protection.

The disclosed extruded board allows for multiple options for finishing. The board can be brush finished, planning, sanded, and painted. The board can be cut and fastened similarly to wood. Moreover, if the board is scratched, the scratch can be removed while maintaining a natural look since the graining pattern extends into the core of the board.

Moreover, the above described process can be modified to provide different aesthetic results. By simply modifying the amount of streaker pellets, it is possible to produce variations in the appearance of the grain. Additional complexity can be achieved by the use of additional colors in both the base resin and the streaker pellets. Moreover, modification of the shape of the streaker pellets will result in a variation of the shape of the resultant grains.

Figure 12:
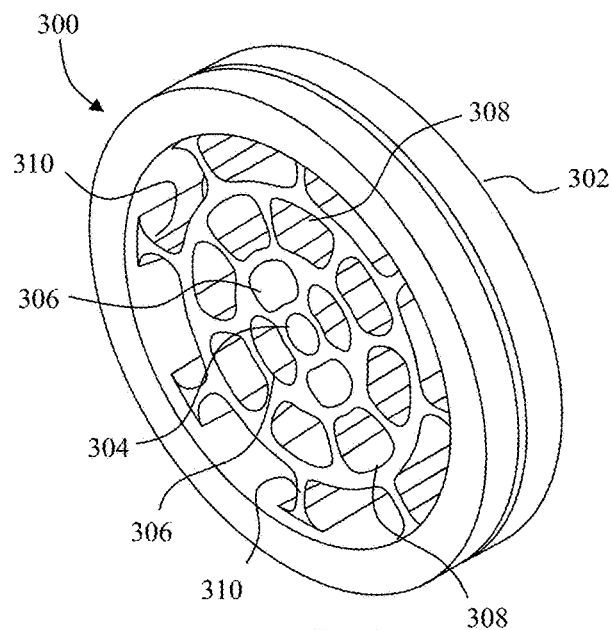
FIG. 12 depicts a perspective view of a breaker plate which can be used with the extruder of FIG. 4.
Figure 13:
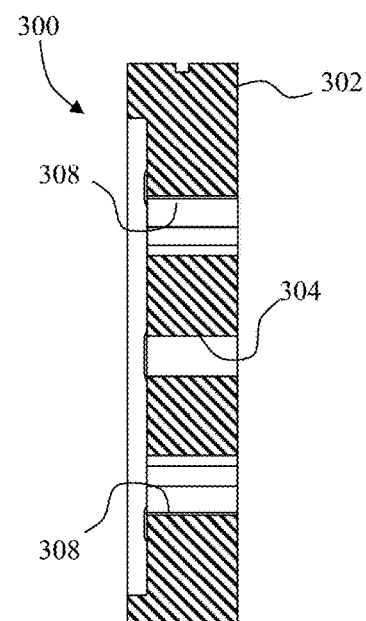
FIG. 13 depicts a cross-sectional view of the breaker plate of FIG. 12.
Figure 14:
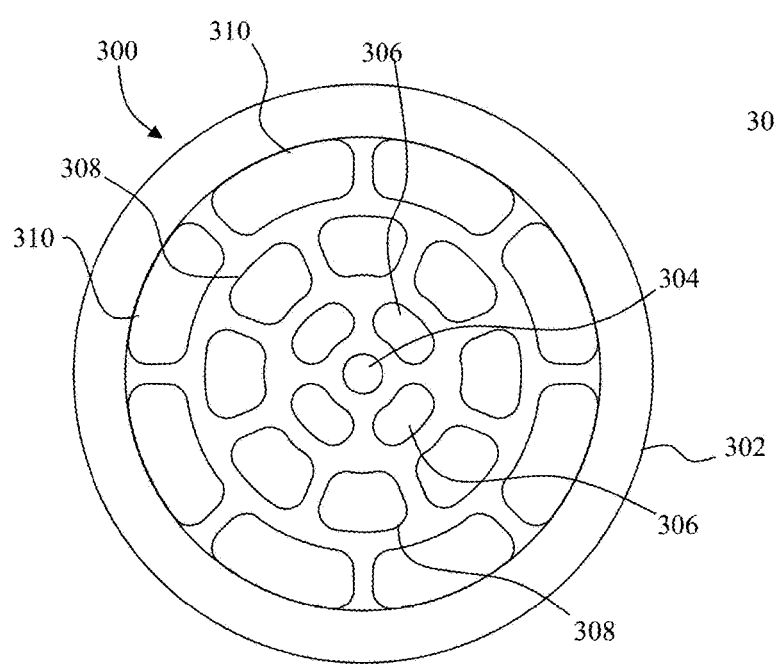
FIG. 14 depicts a front plan view of the breaker plate of FIG. 12.

It is also possible to produce variations in the appearance of the grain by altering the design of the breaker plate. By way of example, FIGS. 12-14 depict a breaker plate 300 which can be used to form extruded boards using the extruder 200 of FIG. 4. The breaker plate 300 includes a base portion 302. A central circular opening 304 is defined within the base portion 302. An innermost ring of elongated openings 306 is located about the circular opening 304. An intermediate ring of elongated openings 308 is located about the elongated openings 306. An outer ring of elongated openings 310 is located about the elongated openings 308. Each of the rings of openings is concentric.

The breaker plate 300 functions similarly to the breaker plate 220. The provision of additional openings, however, results in generally smaller oval-like graining within the core. Additionally, the oval-like graining tends to be located deeper within the core. This is because there is no cone such as the central core 272 of the breaker plate 220 which rolls the extrudate after passing through the openings. Thus, the patterning is not rolled closer to the extruded outer surface.

Design and shape of the breaker plate thus determine the "ring" pattern of the dissimilar materials in the extrudate and the presentation of the grain on the surface of the extruded board. Grain modification can thus be realized by changing the depth of the patterns in the profile of the breaker plate, and well as by changing the shape of the central core.

Other steps in the process can be further modified to provide variations in the graining. As noted above, the amount, color, and shape of streaker pellets can be modified. Moreover, the feed rate of the pellets can be varied within a given extrusion to provide additional randomness.

The above described disclosure thus provides an apparatus for manufacturing extruded boards having color variations throughout which represent "grain" or growth rings found in natural timbers. The variations in color randomly present as cathedrals, arches, chevrons, feathering and movement. The extruded boards are formed using readily available base resins and additives.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A method of forming an extruded board, comprising:
   melting a base resin;
   coloring the melted base resin with a color additive;
   transporting the melted colored base resin and a plurality of at least partially un-melted streaker pellets to a breaker plate with an extruder;
   melting the at least partially un-melted streaker pellets by forcing the transported melted colored base resin and plurality of at least partially un-melted streaker pellets through the breaker plate;
   streaking the melted streaker pellets within the transported melted colored base resin; and
   shaping the streaked transported melted colored base resin into a core of a board having a first outer surface and a second outer surface opposite to the first outer surface.

2. The method of claim 1, further comprising:
   transporting a chemical foaming agent to the breaker plate with the melted colored base resin and the plurality of at least partially un-melted streaker pellets with the extruder; and
   forming a plurality of voids within the streaked transported melted colored base resin with the chemical foaming agent, at least a portion of the plurality of voids opening to the first outer surface of the board.

3. The method of claim 2, further comprising:
   removing an outer surface layer of the board thereby exposing streak portions within an outer exposed portion of the board.

4. The method of claim 3, wherein removing the outer surface layer of the board comprises:
   removing an outer surface layer of between about 0.20 inches and 0.060 inches of the board.

5. The method of claim 4, further comprising:
   embossing the outer exposed portion of the board.

6. The method of claim 5, further comprising:
   forming a clear sealer layer on the embossed outer exposed portion of the board.

7. The method of claim 1, wherein:
   melting the at least partially un-melted streaker pellets comprises forcing the at least partially un-melted streaker pellets toward a breaker plate located adjacent an end portion of an extruder screw; and
   streaking the melted streaker pellets within the transported melted colored base resin comprises slowing movement of the melted streaker pellets with respect to a bulk flow using a breaker plate having a plurality of openings therethrough and located adjacent an end portion of the extruder screw.

8. The method of claim 7, wherein streaking the melted streaker pellets further comprises:
   forcing the melted streaker pellets through a plurality of concentrically positioned orifices in the breaker plate.

9. The method of claim 8, wherein streaking the melted streaker pellets further comprises:
   forcing the melted streaker pellets through a plurality of concentrically positioned circular orifices in the breaker plate.

10. The method of claim 8, wherein all of the orifices are located peripherally about the breaker plate, the method further comprising:
    rolling the melted colored base resin and the streaked melted streaker pellets with a cone shaped portion of the breaker plate.

* * * * *